United States Patent [19]

Guerra

[11] Patent Number: 5,349,443
[45] Date of Patent: Sep. 20, 1994

[54] FLEXIBLE TRANSDUCERS FOR PHOTON TUNNELING MICROSCOPES AND METHODS FOR MAKING AND USING SAME

[75] Inventor: John M. Guerra, Concord, Mass.
[73] Assignee: Polaroid Corporation, Cambridge, Mass.
[21] Appl. No.: 981,270
[22] Filed: Nov. 25, 1992
[51] Int. Cl.⁵ .......................................... G01N 21/17
[52] U.S. Cl. .................................. 356/376; 356/371
[58] Field of Search ...................... 356/371, 376, 429

[56] References Cited

U.S. PATENT DOCUMENTS

| | | | |
|---|---|---|---|
| 3,627,991 | 12/1971 | Beall | 356/71 |
| 4,120,585 | 10/1978 | De Palma et al. | 356/71 |
| 4,681,451 | 7/1987 | Guerra et al. | 356/373 |

Primary Examiner—Richard A. Rosenberger
Attorney, Agent, or Firm—Francis J. Caufield

[57] ABSTRACT

A flexible transducer for use in a photon tunneling microscope apparatus, the transducer comprising an optically transmissive body having a totally internally reflecting (TIR) surface therein and a second surface plano-parallel to the TIR surface when the TIR surface and the second surface are in an unstressed state, the second surface comprising a combination light energy entrance surface and light energy exit surface, the TIR surface being oriented such that light energy introduced at the second surface within the critical angle normally is reflected totally from the interior of the TIR surface to the second surface. A light pattern of variable intensity emerges from the second surface as a result of frustration of total internal reflection at the TIR surface occuring as the TIR surface is brought sufficiently proximate a sample surface. The flexible transducer and the TIR surface thereof are arranged and adapted to be brought into optical contact with, and to conform to, varied macrophotography configurations of the sample surface. The disclosure further relates to methods for making and using the flexible transducer.

28 Claims, 5 Drawing Sheets

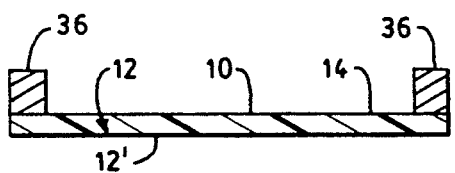
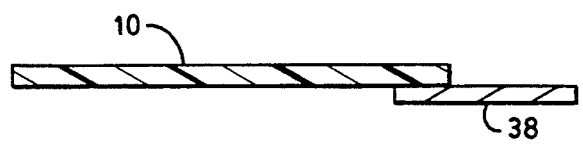
FIG. 6A  FIG. 6B
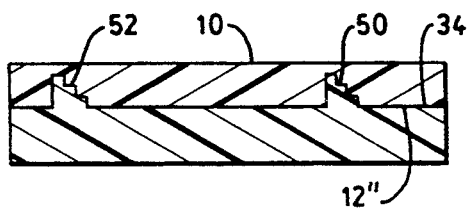
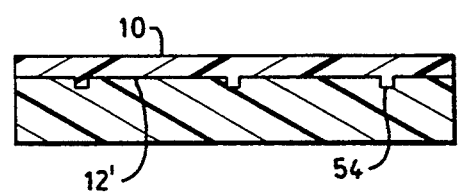
FIG. 7  FIG. 8
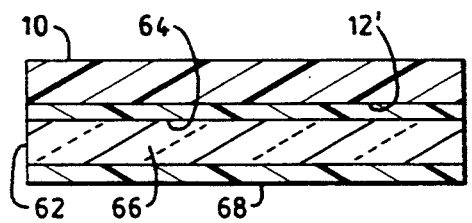
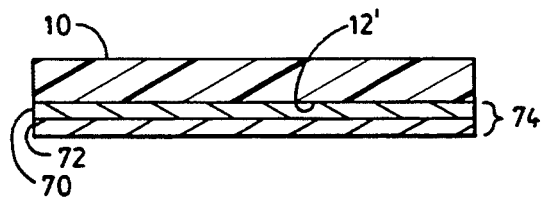
FIG. 9  FIG. 10
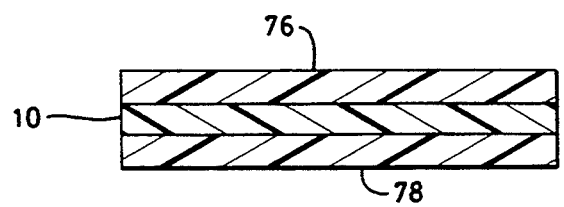
FIG. 11

FLEXIBLE TRANSDUCERS FOR PHOTON TUNNELING MICROSCOPES AND METHODS FOR MAKING AND USING SAME

BACKGROUND OF THE INVENTION

1. Field of the Invention

This invention relates to photon tunneling microscopy and is particularly directed to flexible transducers including their method of fabrication and use.

2. Description of the Prior Art

Photon tunneling microscopy for measuring and visualizing submicron surface topographic features is known. U.S. Pat. No. 4,681,451, issued Jul. 21, 1987 to John M. Guerra, et al. discloses an optical imaging method and apparatus for practicing photon tunneling microscopy. Here, the proximity of a glass surface to a sample surface is determined by frustration of total internal reflection of light energy at the glass/sample interface to develop a patterned area of gray tones. The densities of the gray toned pattern are calibrated such that levels of density correspond to surface proximity. A facsimile of the gray scale image is displayed to indicate variations in sample surface proximity. The pattern of reflected light preferably is magnified, and the magnified image is recorded by a television camera. In a preferred embodiment, the output of the television camera is fed to an oscilloscope adapted to display a three axis image in which one of the three axes corresponds to variation in gray scale density. The output of the television camera may also be fed through a colorizer to assign different colors to different gray scale densities, and a colored facsimile of the pattern image may be presented on a CRT screen.

The method and apparatus of the '451 patent find application in fields in which there is a need for accurate measurement and/or observation of extremely small spacing gaps between surfaces of physical components or of surface features. For example, increases in information bit density of recording media has necessitated correspondingly smaller head gaps to assure accurate transducing of information stored on such recording media. By substitution of a glass body for the conventional magnetic head, the method and apparatus of the '451 patent facilitate observation and quantification of the spacing of a magnetic head relative to the recording media, which may be a magnetic storage tape or disk. Spacings of one microinch may be studied with this technique.

The '451 apparatus features a rigid optically transmissive body, such as a glass block, having thereon the aforementioned glass surface. The glass surface, which can simulate the surface configuration of the magnetic recording head, is substantially flat. Other configurations may be used, and materials other than glass may be used, but in each instance, the optically transmissive body, including the surface proximate the sample surface, is rigid.

When two such surfaces are brought close together, there is a probability that photons tunnel across the gap between the glass surface and the sample surface. The distance of penetration with no gap is approximately 0.75X the illuminating wavelength. Because of this phenomenon, this form of microscopy is known as photon tunneling microscopy. Here, the glass block is known as a "transducer" because the block changes height variations or separations into light modulation. It will be apparent that as the gap enlarges, i.e., the separation between the glass surface and the subject surface increases, fewer photons tunnel; and as the gap increases, more photons tunnel. Thus, variations in the depth of various points in the sample surface produce different degrees of frustration of internal reflection which, in turn, produce observable and measurable imagery.

Photon tunneling microscopy is also described in an article entitled "Photon Tunneling Microscopy" by John M. Guerra, which appeared in *Applied Optics,* Sep. 10, 1990, pages 3741-3752. Described therein is a photon tunneling microscopy apparatus including an optical microscope equipped with vertical illumination, a phototube, and a reflected light oil immersion objective of numerical aperture of greater than 1.0. Here, a microscope cover glass transducer is oil immersed and acts as part of the objective, the distal surface of the transducer being substantially coplanar with the object plane for total internal reflection. A photometric vidicon camera mounted on the phototube converts the gray scale tunneling image into a video signal that is restored by a three-axis oscilloscope as a real time three-dimensional image of the sample microtopography. Additional instrumentation may include an image processor, video recording devices, and a relay video camera that images the three-axis oscilloscope display onto a larger monitor.

Illumination is vertical, introduced to the objective via a beam-splitter which receives light from an illuminator fixed to the microscope tube. The objective is substantially focused on the distal surface, i.e., the glass-air interface, of the glass transducer. The transducer, which is a standard microscope cover glass measuring $39 \times 33 \times 0.2$ mm and of rigid construction, is oil immersed and illumination from N.A. 1 to N.A. 1.25 is reflected totally.

In the method disclosed in the *Applied Optics* article, the rigid transducer is placed onto the sample surface such that the highest peaks in the sample topography contact it. The remainder of the topography forms gaps of varying thicknesses with the transducer. Since the probability of photon tunneling decreases exponentially as the gap increases, the light returning to the microscope is modulated by the topography through photon tunneling and partially frustrated total internal reflection. The result of the partially frustrated internal reflection is a light pattern exiting from the transducer. Peaks appear as dark patches in the subject surface where there is maximum frustration of internal reflection. Increasingly brighter areas arising with a diminution of frustration correspond to increases in internal reflection where the subject surface diverges from the transducer surface. Any sample surface removed from the transducer by a distance greater than the range of the photon microscope, typically about 0.3 microns in the green region of the spectrum, will appear as a white area.

The modulated light forms a grayscale image of the sample in which the grayscale represents height. The tunneling image is viewable directly by eye or with a CCD, or vidicon, can be converted to a three-dimensional representation by an x-y display in which scenic video brightness containing height information is displayed as amplitude where it is perceived as height.

The transducer in the photon tunneling microscope disclosed in the *Applied Optics* article is a rigid planoparallel glass body. The distal surface of the transducer, or glass body, is in the object plane of an oil immersion objective, preferably has a numerical aperture greater than unity, and is adapted to be brought into dry optical contact with the sample surface.

While the method and apparatus disclosed in the '451 patent and the *Applied Optics* article have proven successful in imaging and measuring subnanometer surface topography in real time, the combination of a rigid transducer and subwavelength proximity of the transducer to the sample leads to several problems.

First, there is a problem related to surface cleanliness. The transducer and the sample surface must be free of particulate matter in order to effect the close proximity required for tunneling. Dirty surfaces require cleaning of the sample, which, in turn, can lead to sample damage. Moreover, cleaning without inflicting damage to the sample requires considerable operator skill.

Second, the transducer in such close proximity to a rigid sample surface may itself be damaged or may cause damage to the sample.

Third, a rigid, plano-parallel, transducer cannot image samples that are substantially concave or convex. Although rigid transducers with convex shapes have been used to image and measure concave surfaces, the complexity and costs associated with the provision of such a transducer are excessive. Further, when such shapes are used, they limit later movement of the transducer with respect to the sample. In using a rigid plano-parallel transducer with a convex surface sample, only small areas of the convex sample around the point of contact with the transducer can be imaged.

Fourth, in view of the problems associated with the possible presence of particulate matter on the sample, the danger of the transducer itself inflicting damage on the sample, and the difficulties associated with the transducer and sample having other than opposed parallel planar surfaces, achieving the required proximity between the transducer and the sample requires a high degree of operator skill.

Therefore, it is an object of the invention to provide an improved transducer for a photon tunneling microscope apparatus, the transducer being adapted for use in imaging and measuring sample surfaces having particulate matter thereon.

Another object of the invention is to provide such a transducer which is adapted to engage the sample surface without damaging the sample surface.

A further object of the invention is to provide such a transducer adapted to image and measure concave and convex sample surfaces.

A still further object of the invention is to provide such a transducer requiring less operator skill in achieving appropriate proximity between the transducer and the sample.

Other objects of the invention will be obvious, in part, and, in part, will become apparent when reading the detailed description to follow.

SUMMARY OF THE INVENTION

This invention relates to a flexible transducer for use in a photon tunneling microscope apparatus. The transducer comprises an optically transmissive body of relatively high index of refraction and a totally internally reflecting (TIR) surface therein. A second surface thereof is plano-parallel to the TIR surface when the TIR surface and the second surface are in an unstressed state. The second surface comprises a combination of a light energy entrance surface and a light energy exit surface with the TIR surface oriented such that light energy normal to the second surface is reflected totally from the interior of the TIR surface to the second surface to produce a light pattern of variable intensity which emerges from the second surface as a result of frustration of total internal reflection from the TIR surface. This occurs as the reflective surface is brought sufficiently proximate a sample surface. With the flexible transducer, the TIR surface thereof is arranged and adapted to be brought into optical contact with, and substantially to conform to, varied configurations of the sample surface.

In accordance with a further feature of the invention, there is provided a method for making a flexible optical transducer, the method comprising the steps of forming the transducer on a substrate, curing the transducer on the substrate, and peeling the transducer from the substrate.

In accordance with a still further feature of the invention, there is provided a method for imaging microtopography of a sample surface, the method comprising placing a flexible optical transducer in engagement with the surface, the transducer being sufficiently flexible to conform to the macrotopography of the sample surface, placing an objective portion of a photon tunneling microscope in engagement with the transducer, such that the transducer comprises a portion of the microscope objective, the transducer being sufficiently stiff to provide a substantially flat surface in the field of view of the microscope, and imaging the sample surface in the field of view through the microscope.

The above and other features of the invention, including various novel details of construction and combinations of parts, will now be more particularly described with reference to the accompanying drawings and pointed out in the claims. It will be understood that the particular devices and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings which show illustrative embodiments of the invention. The principles of the present invention will be more clearly understood from reading the detailed description in conjunction with the drawings in which:

FIG. 6A is an enlarged cross-sectional diagrammatic illustration of a flexible transducer fixed to a frame;

FIG. 6B is an enlarged cross-sectional diagrammatic illustration of a flexible transducer with a label fixed thereto;

FIG. 7 is an enlarged cross-sectional diagrammatic illustration of one embodiment of a calibration structure formed in a distal surface of an inventive transducer, with vertical detail of the calibration structure exaggerated for clarity;

FIG. 8 is an enlarged elevational diagrammatic cross-sectional illustration of another alternative embodiment of flexible transducer with means formed on a distal surface thereof for controlling the tunneling gap with the sample surface; vertical detail again is exaggerated for clarity;

FIG. 9 is an enlarged elevational diagrammatic cross-sectional illustration of another alternative embodiment of flexible transducer with optical thin films coated on the distal surface thereof, the thin films comprising a waveguide, with vertical detail exaggerated for clarity;

FIG. 10 is an enlarged cross-sectional diagrammatic illustration of still another alternative embodiment of flexible transducer with optical thin films coated on a distal surface thereof where the thin films are arranged to act as a resonator to selectively alter photon tunneling characteristics; vertical detail is exaggerated for clarity;

FIG. 11 is an enlarged cross-sectional diagrammatic illustration of still another alternative embodiment of flexible transducer with an electrically conductive optically transparent coating on both surfaces thereof for reduction of static charge and/or to apply an electrical potential to the transducer; vertical detail is exaggerated for clarity;

DESCRIPTION OF THE PREFERRED EMBODIMENTS

Figure 1:
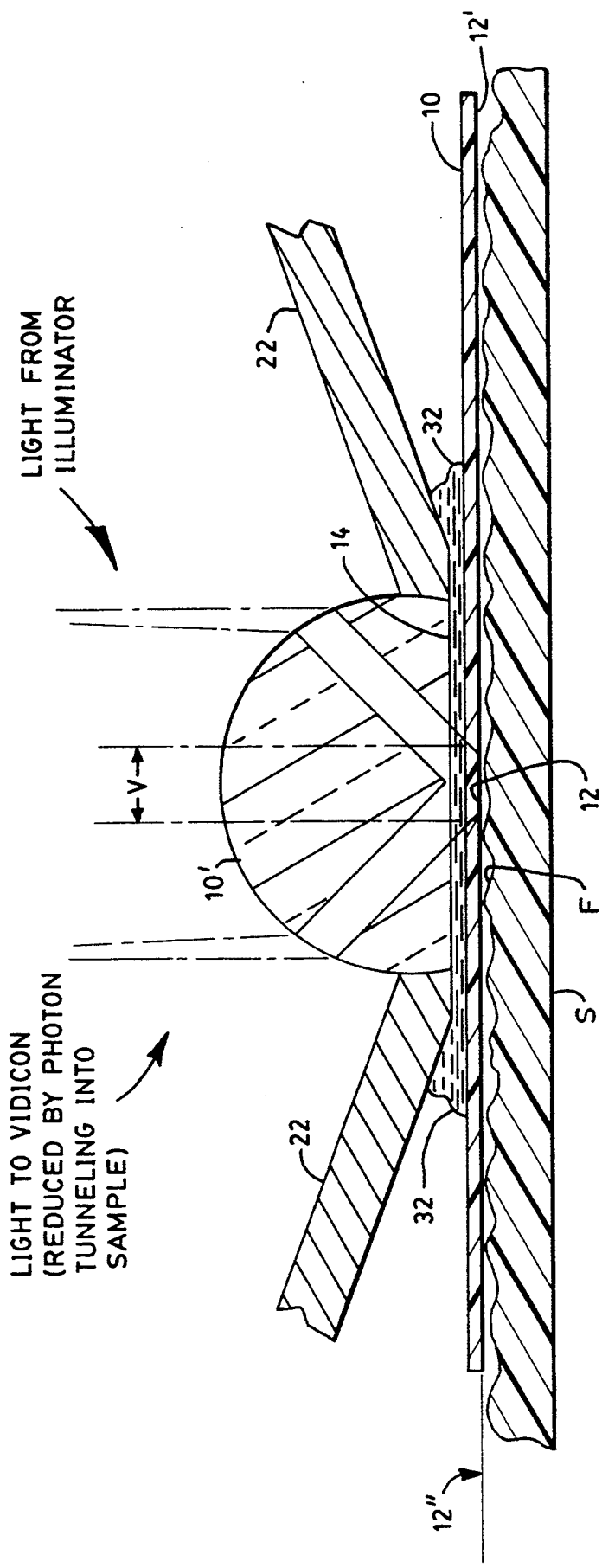
FIG. 1 is a cross-sectional diagrammatic illustration of one form of flexible transducer, shown as part of a photon tunneling microscope objective.

Referring to FIG. 1, there is shown an illustrative transducer 10 formed of an optically transmissive material and comprising a normally planar TIR surface 12. Transducer 10 is optically coupled to a hemispherical lens 10' which is the last element of a microscope objective as will be seen in more detail hereinafter. The transducer 10 is coupled to a second normally planar surface 14, the bottom surface of lens 10', via an index matching oil 32. When not under stress, the surfaces 12 and 14 are parallel. In operation, the TIR surface 12 is spaced from a surface F of a sample S. With adequate spacing of the sample surface F from the TIR surface 12, light introduced at the second surface 14, passing through transducer 10 to the TIR surface 12, within or greater than the critical angle, $I_c$, is totally internally reflected from the surface 12 and exits from the second surface 14 in a well-known manner. The second surface 14 thus serves as a combination light energy entrance surface and light energy exit surface.

Light internally reflected at the boundary of the surface 12 produces an evanescent field which extends from the surface 12, as is discussed in the aforementioned '451 patent. When the sample surface F is spaced from the TIR surface 12 by a distance sufficient to be beyond the evanescent field, total internal reflection of light from the inside of the TIR surface 12 occurs. However, when the sample surface F is moved toward the surface 12, so as to enter the evanescent field, the internal reflection from the surface 12 progressively decays, or becomes "frustrated".

Figure 2:
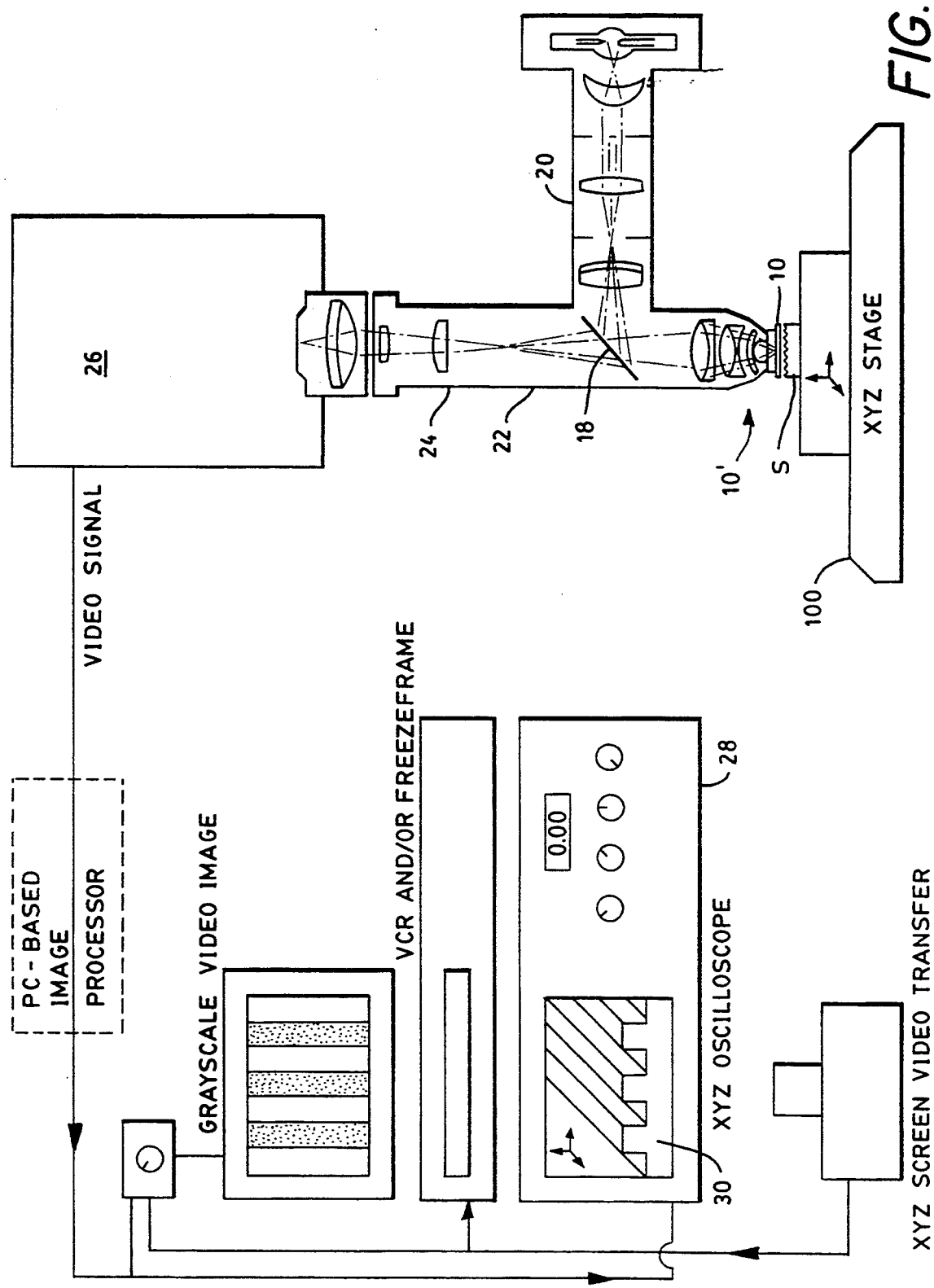
FIG. 2 is a diagrammatic illustration of a photon tunneling microscope and associated equipment, the microscope including the flexible transducer.

Referring to FIG. 2, it can be seen that in one preferred embodiment, light from an illuminator 20 fixed to a tube portion 22 of a photon tunneling microscope 24 is reflected from a beam splitter 18 disposed in the tube portion 22 of the microscope 24, into the transducer 10, through the second surface 14.

A pattern of light is reflected by the surface 12 to the second surface 14, which pattern results from frustration of total internal reflection from the surface $12i$ in turn resulting from proximity of the surface 12 to the sample surface F. The pattern is magnified by the microscope 24 for which the transducer 10 serves as a portion of the microscope objective with element 10'. Here a distal surface 12' of transducer 10 is arranged to be approximately coplanar with the microscope object plane (FIG. 1). An enlarged gray scale image produced by microscope 24 is converted to a facsimile in which gray scale densities at coordinate locations throughout the area of the magnified range are recorded. The electronic facsimile of the magnified image is detected by a camera 26 and preferably is fed to a three dimensional display 28 (FIG. 2) having a screen 30 on which orthogonal coordinates of the magnified image may be presented on "x" and "y" axes while gray scale density variations are presented on a third, or "z", axis.

In accordance with the invention, the transducer 10 is a flexible, optically transparent body, and in combination with the microscope objective has a numerical aperture of 1.0 or greater since a numerical aperture of less than 1.0 results in specular reflection. By increasing numerical aperture above 1.0, total internal reflection is realized. In practice, a numerical aperture of 1.25 has been found to be most satisfactory when the space between the transducer distal surface 12' and the sample surface F is air. In instances in which the space is filled with water, rather than air, as in imaging of biological samples, it is preferable that the numerical aperture be about 1.40.

In one embodiment, the transducer is made optically transparent over a selected spectral range so as to act as a bandpass filter. That is, light transversing the transducer is limited to a selected range of wavelengths.

Figure 3:
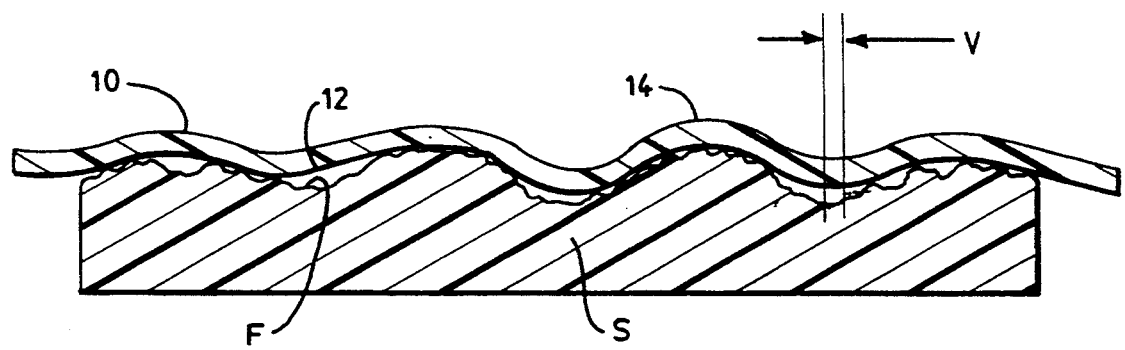
FIG. 3 is an enlarged cross-sectional diagrammatic illustration of the flexible transducer shown in contact with a sample surface.

The transducer 10 is formed of a material so as to be sufficiently rigid over the approximate field of view, V, of the microscope 24 (FIGS. 1 and 3), to form a tunneling gap with the sample topography, but sufficiently flexible to conform to concave, convex, or other macro topography features of the sample S. As illustrated in FIG. 3, transducer 10 is sufficiently flexible to substantially conform to the macrotopography (low spatial frequencies) of the sample surface, F, while being sufficiently stiff to provide a substantially flat surface within the microscope field of view, V. Transducer 10 need not be precisely flat, or precisely normal to the tube axis of the microscope, provided that in the field of view the transducer is within the depth of focus of the objective less the transducer thickness. In plan, the field of view, V, is circular and in one preferred embodiment has a diameter of about 150 microns.

For most applications, transducer 10 is optically smooth such that microroughness thereof does not contribute to the tunneling image. However, the distal surface 12' of the transducer may be slightly roughened so as to alter the evanescent field to improve lateral resolution. With a numerical aperture of 1.25, the vertical resolution is less than one nanometer and the lateral resolution is better than 0.16 micron. The lateral resolution may be further improved by imparting a controlled optical roughness to the distal surface, either randomly or periodically oriented during its manufacture. The added roughness alters the tunneling characteristics to improve the lateral resolution, but somewhat at the expense of vertical resolution.

Transducer 10, as already mentioned, comprises a portion of the objective 10' of the microscope 24 (shown in FIG. 1) which has an essentially zero working distance. That is, the distance between the focus of the microscope objective and the objective distal surface 14 is, in this instance, essentially optically zero, inasmuch as the objective distal surface 14 and the transducer distal surface 12' are proximate the focus of the objective. The distal surface 12' of the transducer 10 is placed in optical unity with the lens 10' by an index-matching immersion medium, such as oil 32, in contact with the second surface 14. As noted hereinabove, the distal surface 12' is adapted to conform to, and optically contact, sample shapes while maintaining substantial flatness at least over the field of view of the microscope 24.

The material from which the flexible transducer is formed is such as not to be harmed by contact with immersion oil 32 and is selected so as to be less hard than the rigid samples to be imaged. This eliminates inflicting damage to the sample from transducer contact. A preferred material for the transducer is an ultra-violet curing polymer. Commercially available polymers for this purpose include Norland's #61 and #81, the former being the more flexible of the two. Other acceptable materials include polyethylene tetraphthalate, commonly known as Mylar, polycarbonate, polyester, collodion solution in amyl acetate, polyvinyl formal, commonly known as Formvar, cellulose acetate, quartz, glass or silicon. Generally, it is preferable that the transducer material be hydrophobic.

Figure 4:
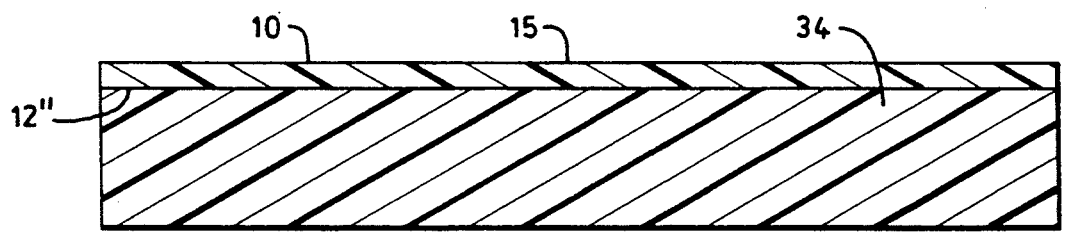
FIG. 4 is an enlarged cross-sectional diagrammatic illustration of a disposable molded substrate with a peelable flexible transducer thereon.

Flexible transducer 10 may be formed by casting or spincoating, for example, an ultra-violet curing polymer film onto an optically smooth substrate surface 34 (FIG. 4), preferably of a material such as float glass or polished silicon. The thickness of the transducer is formed greater than about 10 microns, to prevent the tunneling photons from tunneling back into the microscope via waveguiding. Otherwise, the thickness of the transducer is determined by the requirements of the sample. Very smooth samples need stiffer, and thus thicker, transducers, so that the transducer does not sag into shallow topography, while surfaces that are steeply curved on a macro scale require thinner transducers for more flexibility. Instead of, or in combination with, thickness, the flexibility/stiffness of the transducer may be controlled by selection of polymer hardness. The transducer distal surface 12' which, in manufacture, is adjacent the optically smooth substrate surface 34 is similarly smooth, while the transducer exposed surface 15, adjacent air in manufacture, need not be optically smooth, or flat, inasmuch as such surface is in optical unity with immersion oil 32. It is the transducer smooth surface 12' which, in operation, physically engages the sample surface F.

After curing, the polymer film, or other selected material, may be peeled from the substrate 34. The sections individually may be stretched over, and attached to, a rigid frame 36 (FIG. 6A), which may be of aluminum, glass or plastic. Each section further may be formed individually with a foil or paper label 38 attached thereto (FIG. 6B), for ease in stripping the transducer off the substrate surface 34. Label 38 can also serve to support commercial identification, instructions, and the like. After stripping, label 38 may also serve as a "handle" for facilitating ready manipulation of transducer 10.

Transducer 10 easily may be made to cover a variety of selected areas such as one large enough to cover a 5 inch silicon wafer. With large transducers, the sample may be completely protected while the microscope can be moved to any transducer-covered area of the sample to inspect it.

Figure 5:
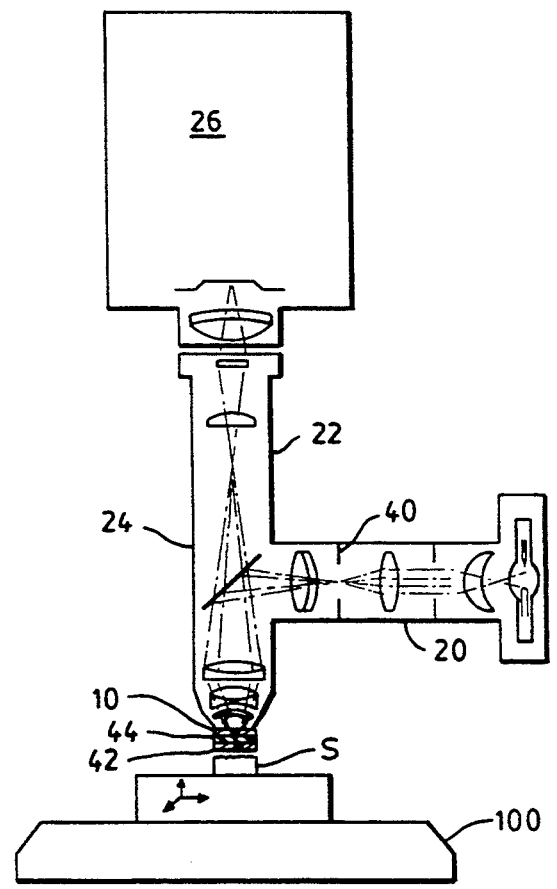
FIG. 5 is a diagrammatic illustration of a photon tunneling microscope configured for microlithography and featuring an alternative form of flexible transducer shown in combination with a semiconductor, the transducer and semiconductor being magnified in diagrammatic cross-section for illustrative purposes.

Further, the ability to cover a wafer completely with a large flexible transducer allows the photon tunneling microscope to be used in reverse (FIG. 5) wherein a pattern or mask placed in a field-stop plane 40 in the microscope's illuminator 20 is reduced and projected onto a semiconductor wafer 42, coated with a photoresist material 44, to expose it via photon tunneling through the transducer 10. The super resolution of the photon tunneling microscope permits production of smaller microlithographic structures than was previously possible.

When the transducer 10 is stripped from the substrate surface 34, the peeling action statically charges it, inherently making it attractive with the sample S. In applications wherein a static charge is deleterious as, for example, in the microelectronics industry, the transducer may be stretched over the rigid frame 36 (FIG. 6A), as noted above, and contacted to the sample by delicate and adjustable vertical pressure. Alternatively, the microscope 24 may be inverted (not shown) such that the sample is gravity-loaded into a frame-mounted flexible transducer.

Inasmuch as manufacture of the flexible transducers is quite economical, the transducers may be treated as "disposable". In each imaging operation, a new flexible transducer may be placed in contact with the sample. As noted above, the smooth distal surface 12' of the transducer 10 is peeled from the substrate surface 34 used in manufacture of the transducer and applied to the surface F of the sample S. Thus, the smooth surface 12' of transducer 10 is substantially free of particulates when applied to sample S.

If it is desired to image sample surfaces known to have particulate matter thereon, the transducer may be made sufficiently flexible to envelope isolated particulate, while achieving necessary proximity with clean areas on the sample. This feature protects the sample from cleaning damage and from transducer contact damage prevalent in the use of rigid transducers. The removal, or severe diminution, of the prospect of contact damage greatly reduces the skill required of the operator in contacting the transducer to the sample. The feature further renders the imaging apparatus usable in areas other than "clean rooms".

In view of the manner in which the flexible transducer intimately contacts the sample, the microscope is more immune to environmental vibrations than is the case with rigid transducers. In spite of the contact, a rigid transducer is given to "see-saw" on slightly convex sample surfaces when exposed to vibration.

A further advantage and benefit found in the flexible transducer is its ready acceptance, in manufacture, of a host of structures for a variety of specialized uses. For example, by providing a structure 50 (FIG. 7) on the substrate surface 34, upon which the transducer 10 is cast or spincoated, a staircase structure 52 may be recessed into the transducer to provide an integral calibration target, available within the field of view for both vertical height and lateral magnification calibration and measurement. In another example, raised structures 54 in the form of dots, grids, lines, or the like, on the transducer may be used to space the transducer away from the sample by a controlled amount (FIG. 8) to maintain a proper tunneling gap between two smooth surfaces. This feature also permits imaging of samples that wet to the transducer as, for example, some polymers and biological samples. The feature further facilitates imaging of metallic samples where the tunneling to height relationship may become ambiguous if the tunneling gap is too small.

Rather than imparting a substrate feature onto or into the transducer distal surface during formation of the transducer, such features may be imparted to the transducer after forming of the transducer and removal from the substrate by embossing the transducer distal surface by a mechanical embosser (not shown).

As an alternative to forming structure means on the transducer, chemical surface treatments may be utilized to obtain similar results in some instances. For example, while mechanically distancing the transducer distal surface from the sample surface by use of structures 54, or the like, chemical surface treatment may be used for imaging of samples that wet to the transducer coupling layers. An alternative is to form a coating of, for example, silane on the substrate and form the transducer over the silane. Upon peeling of the transducer from the substrate, the transducer emerges with the silane adhered to the transducer distal surface. The silane rejects wetting to the polymeric transducer and permits imaging smooth problematic polymers.

Referring to FIG. 9, it will be seen that in an alternative embodiment a portion 60 of the transducer is provided with a waveguide 62, including a cladding coating 64 on the distal surface 12' of transducer 10, a core coating 66 thereon, and a second cladding coating 68 over the core coating. The coatings 64, 66 and 68 form a flexible waveguide, such that external illumination may be delivered to the sample surface for fluorescence and various studies simultaneously with imaging.

In another alternative embodiment, flexible transducer 10 is provided with an optical thin film 70 coated onto its distal surface 12' and adapted to act as flexible resonator means 74 to alter the photon tunneling characteristics and obtain improved vertical resolution in imagery of extremely smooth surfaces. As shown in FIG. 10, a plurality of optical thin films 70, 72 may be used in cooperation with the transducer 10.

Referring to FIG. 11, there will be seen still another alternative embodiment in which both sides of the transducer 10 are provided with an electrically conductive optically transparent flexible coating 76, 78 for reduction of static charge and/or for provision of an electrical potential to the transducer.

Figure 12:
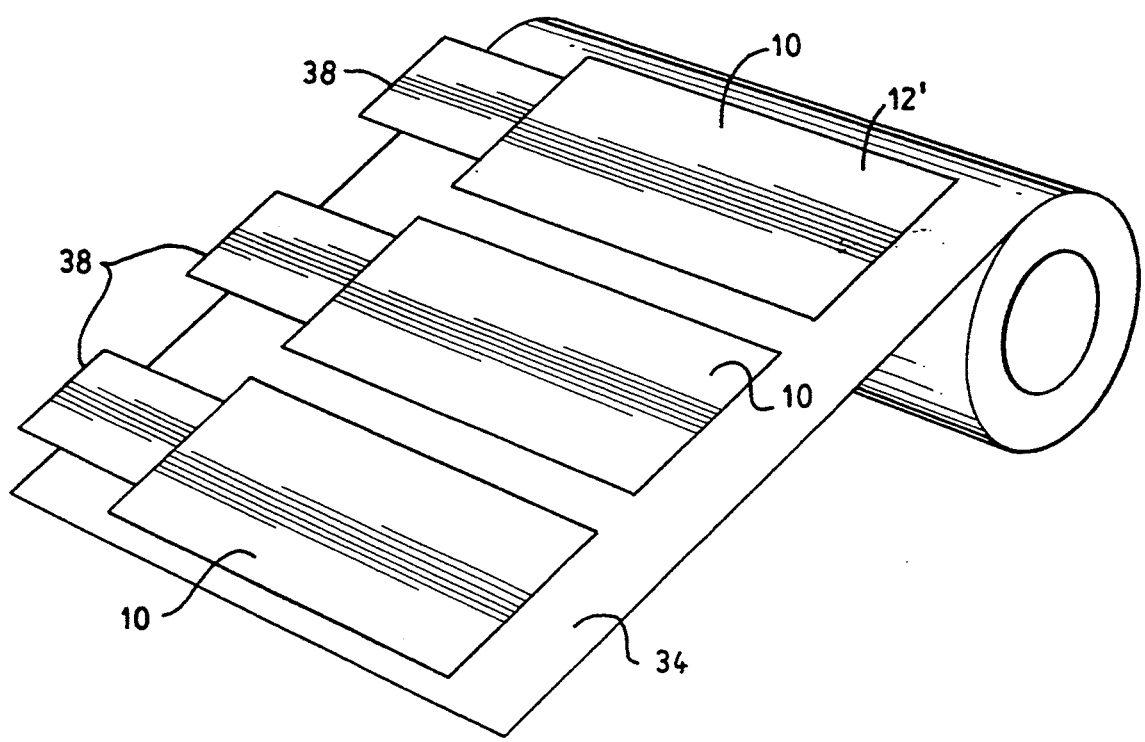
FIG. 12 is a diagrammatic perspective view of a rolled length of substrate supporting numerous flexible transducers formed thereon.

In FIG. 12, there is shown an illustrative roll 80 of substrate 34, or carrier, of separate transducers 10, or, in the alternative, for a continuous flexible transducer strip (not shown). As described above, each transducer 10 may have a label 38 attached thereto to facilitate easy removal and subsequent handling.

Figure 13:
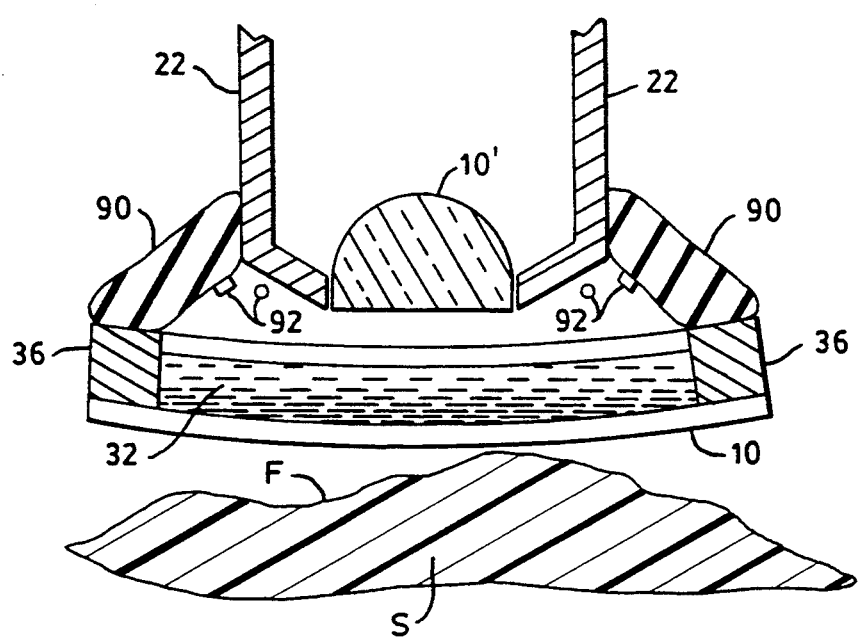
FIG. 13 is an enlarged diagrammatic elevation, partially in section, illustrating a flexible transducer fixed to a housing pressurized with a gas and in a free state just before contacting a sample.

In FIG. 13, there is shown another means for facilitating proximity of the transducer to the sample. Gas such as air under pressure, within a sealed housing 90, attached to which is a framed transducer 10, may be used to bias the transducer into contact with the sample.

Thus, there is provided an improved transducer for a photon tunneling microscope. The transducer is: adapted for use in imaging and quantifying sample surfaces having particulate matter thereon, adapted to engage a sample surface without damaging the sample surface, and adapted for use with concave and convex sample surfaces. Less operator skill is required to achieve appropriate contact and proximity between the transducer distal surface and the sample. Further, there is provided an improved transducer which is readily and inexpensively modifiable to perform specialized functions.

In operation, the sample S is placed upon a stage 100 beneath the lower end of the microscope tube 22. A transducer 10 is removed from the substrate surface 34 and placed upon the sample surface F. Immersion oil 32 is added to the second surface 14. The lens 10' of the microscope 24, less the oil 32 and transducer 10, is then brought to bear upon the oil-immersed second surface 14. As described above, light from the illuminator 20, reflected off the beam splitter 18, is directed through the second surface 14 and into the transducer, where the light is totally reflected by the transducer TIR surface 12, except where the proximity of the sample surface F causes frustration of total reflection. Frustration then results in an image directed to the transducer second surface 14, which image may be magnified by the microscope 24 and further enhanced, if desired, for imaging and for quantification.

Accordingly, there is provided a method for imaging and quantifying microtopography which may be utilized with samples having particulate matter thereon and without damage to the sample. The method further facilitates such imaging and quantifying of sample surfaces of concave or convex configuration. Still further, the method herein described requires less operator skill than is required with respect to the use of rigid transducers.

It will be understood that the present invention is by no means limited to the particular constructions and methods herein disclosed and/or shown in the drawings, but also comprises any modifications or equivalents within the scope of the claims.

What is claimed is:

1. A flexible optical transducer for use with a photon tunneling microscope of the type having a hemispherical objective lens with a planar front surface and a predetermined field of view, said transducer being made of a thin, flat member structured and arranged to have flexibility sufficient to conform to the macrotopography of a sample surface without conforming to its microtopography and stiffness to provide a substantially flat surface over an area of the planar front surface of the hemispherical objective lens corresponding to the field of view of the microscope when said transducer is brought into optical contact with the planar front surface with a fluid which matches the index between the two, said disposable transducer sufficiently thin so that when it is in place between the planar front surface of the microscope objective and overlying a sample, the evanescent field created by the photon tunneling effect is selectively disrupted in accordance with the variation in the microtopography of the sample to create an image which can be encoded in gray levels corresponding the depth of the sample microtopography.

2. The flexible optical transducer of claim 1 wherein the surface adapted to engage a sample surface is referred to a the distal surface and is optically smooth compared with the optical smoothness of the microtopography of a sample.

3. The flexible optical transducer of claim 2 wherein said distal surface of said transducer is provided in areas thereof with a selected degree of roughness to enhance lateral resolution.

4. The flexible optical transducer of claim 3 wherein said roughness is randomly disposed on said otherwise optically smooth surface.

5. The flexible optical transducer of claim 3 wherein said roughness is oriented in selected periodic fashion on said otherwise optically smooth surface.

6. The flexible optical transducer of claim 1 wherein said transducer comprises a material selected from ultra-violet curing polymers and polyethylene tetraphthalate, polycarbonate, polyester, collodion solution in amyl acetate, polyvinyl formal, quartz, glass and silicon.

7. The flexible optical transducer of claim 6 wherein said transducer is hydrophobic.

8. The flexible optical transducer of claim 6 wherein said transducer has a thickness of 10 microns or greater.

9. The flexible optical transducer of claim 8 wherein said transducer is mounted on a rigid frame at the periphery of said transducer.

10. The flexible optical transducer of claim 8 further including a label fixed to said transducer to facilitate manipulation of said transducer.

11. The flexible optical transducer of claim 8 further including calibration structure recesses in said distal surface thereof.

12. The flexible transducer of claim 8 further including flexible waveguide means fixed to said distal surface thereof, said waveguide means comprising a first coating of cladding material on said distal surface, a coating of core material on said first coating, and a second coating of cladding material on said core coating, said waveguide being operative to introduce external illumination to said transducer for transfer to a sample.

13. The flexible transducer of claim 8 further including flexible resonator means fixed to said transducer, said resonator means comprising at least one optical film coated onto the distal surface of said transducer to alter its photon tunneling characteristics to enhance vertical resolution.

14. The flexible transducer of claim 8 further comprising electrically conductive optically transparent coatings applied to each of said distal and second surfaces of said transducer to relieve static charge and to facilitate provision of electric potential.

15. The flexible transducer of claim 1 wherein the surface which contacts a sample is chemically treated to prevent wetting.

16. The transducer of claim 1 wherein the area corresponding to the microscope objective's field of view over which said transducer remains substantially flat is an area with a span of about 10 micrometers.

17. In a transducer for use in a photon tunneling microscope having a hemispherical objective lens with a planar front surface and a predetermined field of view, said transducer comprising an optically transmissive flat, thin body having a totally internally reflecting surface and a second surface plano-parallel to said reflective surface when said reflective surface and said second surface are in an unstressed state, said second surface comprising a combination light energy entrance surface and light energy exit surface, said reflective surface being oriented such that light energy introduced from the microscope at said second surface is reflected totally from the interior of said reflective surface to said second surface such that a light pattern of variable intensity emerges from said second surface as a result of frustration of total internal reflection said reflective surface as said reflective surface is brought sufficiently proximate a sample surface said transducer being flexible and said reflective surface thereof arranged and adapted to be brought into optical contact with, and to conform to, varied configuration of the sample surface microtopography.

18. The transducer of claim 17 wherein said transducer is sufficiently stiff to provide a substantially flat surface in the field of view of said photon tunneling microscope.

19. The transducer of claim 18 wherein said second surface of said transducer is adapted to be immersed in an immersion oil in optical unity with said transducer and is of a material compatible with said immersion oil.

20. An assembly for photon tunneling microscopic imaging, said assembly comprising:
an optical microscope with a predetermined field of view and having an objective including a flexible optical transducer;
an illuminator for providing light energy to said microscope;
a stage for supporting a sample beneath said microscope;
said flexible optical transducer being arranged and adapted to engage said sample and substantially conform to the macrotopography of said sample, said flexible optical transducer comprising: an optically transmissive body having a totally internally reflecting surface therein, and a second surface plano-parallel to said reflective surface when said reflective surface and said second surface are in an unstressed state, said second surface comprising a combination light energy entrance surface and light energy exit surface, said reflective surface being oriented such that light energy introduced at said second surface is adapted to be reflected totally from the interior of said reflective surface to said second surface such that a light pattern of variable intensity emerges from said second surface as a result of frustration of total internal reflection from said reflective surface as said reflective surface is brought sufficiently proximate a surface of said sample.

21. The assembly of claim 26 wherein a distal outside surface of said transducer is adapted to engage said sample surface and substantially conform thereto, and is sufficiently stiff to provide a substantially flat surface over the field of view of said photon tunneling microscope.

22. The assembly of claim 21 wherein said transducer is adapted to operate over a numerical aperture greater than 1.0.

23. The assembly of claim 22 wherein said microscope includes an objective element which includes said second surface.

24. The assembly of claim 23 further including pressure means for directing said transducer to flex toward said sample surface.

25. An assembly for photon tunneling microscopic imaging, said assembly comprising:

an inverted photon tunneling microscope having an objective lens;

a framed optically transmissive flexible transducer mounted on said microscope such that said transducer forms a part of said objective lens of said microscope;

said flexible transducer being adapted to receive a sample such that, under the bias of gravity it engages said flexible transducer with said flexible transducer being adapted to substantially conform to the engaged surface of said sample.

26. An assembly for production of microlithographic structures, said assembly comprising a photon tunneling microscope, an objective portion of said microscope having as a portion thereof a flexible optical transducer, an illuminator fixed to said microscope and adapted to provide light energy to said microscope, said illuminator having a field stop plane adapted to receive a pattern member, a semiconductor wafer with a photoresist material layer thereon disposed proximate a focal point of said microscope, said transducer being adapted to contact, and substantially conform to, said photoresist material layer on said semiconductor wafer, whereby light from said illuminator is directed through said pattern, and through said microscope, and through said flexible transducer in engagement with said photoresist material layer on said semiconductor wafer, onto said photoresist layer of said semiconductor wafer, to provide a basis for completion of said microlithographic structure.

27. A method for imaging microtopography of a sample surface, said method comprising:

placing a flexible optical transducer in engagement with said surface, said transducer being sufficiently flexible for a distal surface thereof to conform to the macrotopography of said sample surface;

depositing an immersion oil on a second surface of said transducer, said oil being in optical unity with said transducer;

placing an objective portion of a photon tunneling microscope in engagement with said oil immersed transducer second surface such that said oil and said transducer comprise portions of said microscope objective;

said transducer being sufficiently stiff to provide a substantially flat surface in the field of view of said microscope, and imaging said sample surface in said field of view through said microscope.

28. A method for imaging microtopography of a sample surface by photon tunneling means, said method comprising the steps of placing said sample on a stage;

placing a flexible optical transducer on said sample surface;

said transducer being adapted to engage portions of said sample surface, said transducer being sufficiently flexible to substantially conform to the macrotopography of said sample;

providing a photon tunneling microscope having an objective portion, said transducer comprising another portion of said microscope objective, said transducer having a totally internally reflecting surface therein, and a second surface planoparallel to said reflective surface when said reflective surface and said second surface are in an unstressed state, said second surface comprising a combination light energy entrance surface and light energy exit surface, said reflective surface being oriented such that light energy introduced at said second surface is reflected totally from the interior of said reflective surface to said second surface, such that a light pattern of variable intensity emerges from said second surface as a result of frustration of total internal reflection from said reflective surface as said reflective surface is brought sufficiently proximate said sample surface;

depositing an immersion oil on said second surface of said transducer, said oil being in optical unity with said transducer, said oil forming another portion of said microscope objective;

moving said stage and said microscope objective portion together, such that said microscope objective portion engages said oil-immersed transducer second surface; and providing means for imaging said light pattern emerging from said transducer second surface.

* * * * *